US011050718B2

(12) United States Patent
Aoki

(10) Patent No.: US 11,050,718 B2
(45) Date of Patent: Jun. 29, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Koji Aoki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 136 days.

(21) Appl. No.: 16/381,119

(22) Filed: Apr. 11, 2019

(65) Prior Publication Data

US 2020/0106751 A1     Apr. 2, 2020

(30) Foreign Application Priority Data

Oct. 1, 2018  (JP) .............................. JP2018-186911

(51) Int. Cl.
*H04L 29/06*          (2006.01)
(52) U.S. Cl.
CPC ........ *H04L 63/0428* (2013.01); *H04L 63/205* (2013.01)
(58) Field of Classification Search
CPC . H04W 28/00; H04W 28/0205; H04W 28/08; H04W 28/16; H04W 12/00502;
(Continued)

(56) References Cited

U.S. PATENT DOCUMENTS 6,754,701 B1 *  6/2004  Kessner .............. G06F 11/3414
                                                          709/203
7,050,940 B2 *  5/2006  Basso ..................... H04L 69/28
                                                          370/345
(Continued)

FOREIGN PATENT DOCUMENTS

| JP | 2008-299617 A | 12/2008 |
| JP | 2017-220818 A | 12/2017 |
| JP | 2018-10674 A  | 1/2018  |

OTHER PUBLICATIONS

P. Hoffman, SMTP Service Extension for Secure SMTP over Transport Layer Security, Feb. 2002, Internet Mail Consortium, Request for Comments (RFC) 3207 (Year: 2002).*

(Continued)

*Primary Examiner* — Carl G Colin
*Assistant Examiner* — Nirav C Shah
(74) *Attorney, Agent, or Firm* — Oliff PLC

(57) ABSTRACT

An information processing apparatus includes a first cryptographic communication control unit, a second cryptographic communication control unit, and a timeout control unit. The first cryptographic communication control unit issues an encrypted connection request to a communication destination node and performs cryptographic communication. The second cryptographic communication control unit issues, concurrently with the connection request by the first cryptographic communication control unit, a connection request by plain text to the communication destination node, establishes connection, and then performs cryptographic communication. The timeout control unit changes a period for a timeout set in advance for the connection request by the first cryptographic communication control unit in a case where a response to the connection request by the second cryptographic communication control unit is received from the communication destination node before a response to the connection request by the first cryptographic communication control unit is received from the communication destination node.

6 Claims, 8 Drawing Sheets

(58) Field of Classification Search
CPC ..... H04L 12/12; H04L 12/2859; H04L 67/14; H04L 51/00; H04L 67/322; H04L 63/0428; H04L 63/205; H04L 63/108; H04L 2463/121
See application file for complete search history.

(56) References Cited

U.S. PATENT DOCUMENTS

| | | | |
|---|---|---|---|
| 8,127,020 B2* | 2/2012 | Riemers | G06F 15/16 |
| | | | 709/227 |
| 8,307,031 B1* | 11/2012 | Grieve | H04L 69/28 |
| | | | 709/203 |
| 9,537,899 B2 | 1/2017 | Cox et al. | |
| 2008/0301225 A1 | 12/2008 | Kamura | |
| 2012/0033811 A1* | 2/2012 | Hawkes | H04L 9/08 |
| | | | 380/255 |
| 2015/0186802 A1* | 7/2015 | Hulbert | G06Q 10/02 |
| 2017/0180238 A1* | 6/2017 | Telle | H04L 43/50 |
| 2018/0152484 A1 | 5/2018 | Cox et al. | |

OTHER PUBLICATIONS

Richard Carter and Ludmila Cherkasova, Detecting Timed-Out Client Requests for Avoiding Livelock and Improving Web Server Performance (Year: 2000).*

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-186911 filed Oct. 1, 2018.

BACKGROUND

(i) Technical Field

The present disclosure relates to an information processing apparatus and a non-transitory computer readable medium.

(ii) Related Art

In communication between a server and a client, in terms of security, encrypted messages are transmitted and received. Japanese Unexamined Patent Application Publication No. 2017-220818 discloses a technique for transmitting, in accordance with a connection request by plain-text communication, a connection request by cryptographic communication and the connection request by plain-text communication concurrently to a server and establishing connection by cryptographic communication or connection by plain-text communication in accordance with a response from the server.

SUMMARY

For execution of cryptographic communication between a server and a client, both the server and the client need to support the same cryptographic communication. If the server does not support cryptographic communication, after the client issues a connection request by cryptographic communication, the client needs to suspend the next processing until a response from the server has timed out.

Aspects of non-limiting embodiments of the present disclosure relate to being able to flexibly control a period from issuance of a connection request from a client to a server until execution of transmission and reception of a message, compared to a configuration that simply executes fallback.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a first cryptographic communication control unit, a second cryptographic communication control unit, and a timeout control unit. The first cryptographic communication control unit issues an encrypted connection request to a communication destination node and performs cryptographic communication. The second cryptographic communication control unit issues, concurrently with the connection request by the first cryptographic communication control unit, a connection request by plain text to the communication destination node, establishes connection, and then performs cryptographic communication. The timeout control unit changes a period for a timeout set in advance for the connection request by the first cryptographic communication control unit in a case where a response to the connection request by the second cryptographic communication control unit is received from the communication destination node before a response to the connection request by the first cryptographic communication control unit is received from the communication destination node.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be explained in detail with reference to drawings. An exemplary embodiment may be implemented by an information processing apparatus that performs communication via a network, and various communication systems may be adopted. Hereinafter, a case where communication using e-mails is performed will be explained as an example.

System Configuration

Figure 1:
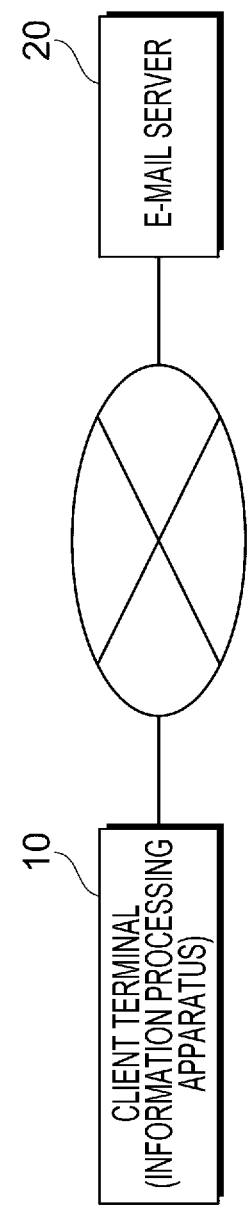
FIG. 1 is a diagram illustrating the entire configuration of an information processing system according to an exemplary embodiment.

FIG. 1 is a diagram illustrating the entire configuration of an information processing system according to an exemplary embodiment. The information processing system includes a client terminal 10 and an e-mail server 20. The client terminal 10 is an information processing apparatus that transmits and receives e-mails to and from another information processing apparatus, which is not illustrated in FIG. 1. E-mails are transferred via the e-mail server 20. Thus, for transmission of e-mails, the client terminal 10 is connected to the e-mail server 20 and transmits an e-mail to the e-mail server 20. Then, the e-mail server 20 transfers the e-mail to an e-mail server to which another information processing apparatus as a transmission destination is connected. For reception of e-mails, the client terminal 10 is connected to the e-mail server 20, and acquires an e-mail stored in the e-mail server 20. That is, the e-mail server 20 serves as a communication destination node in communication using e-mails performed by the client terminal 10.

Functional Configuration of Client Terminal

Figure 2:
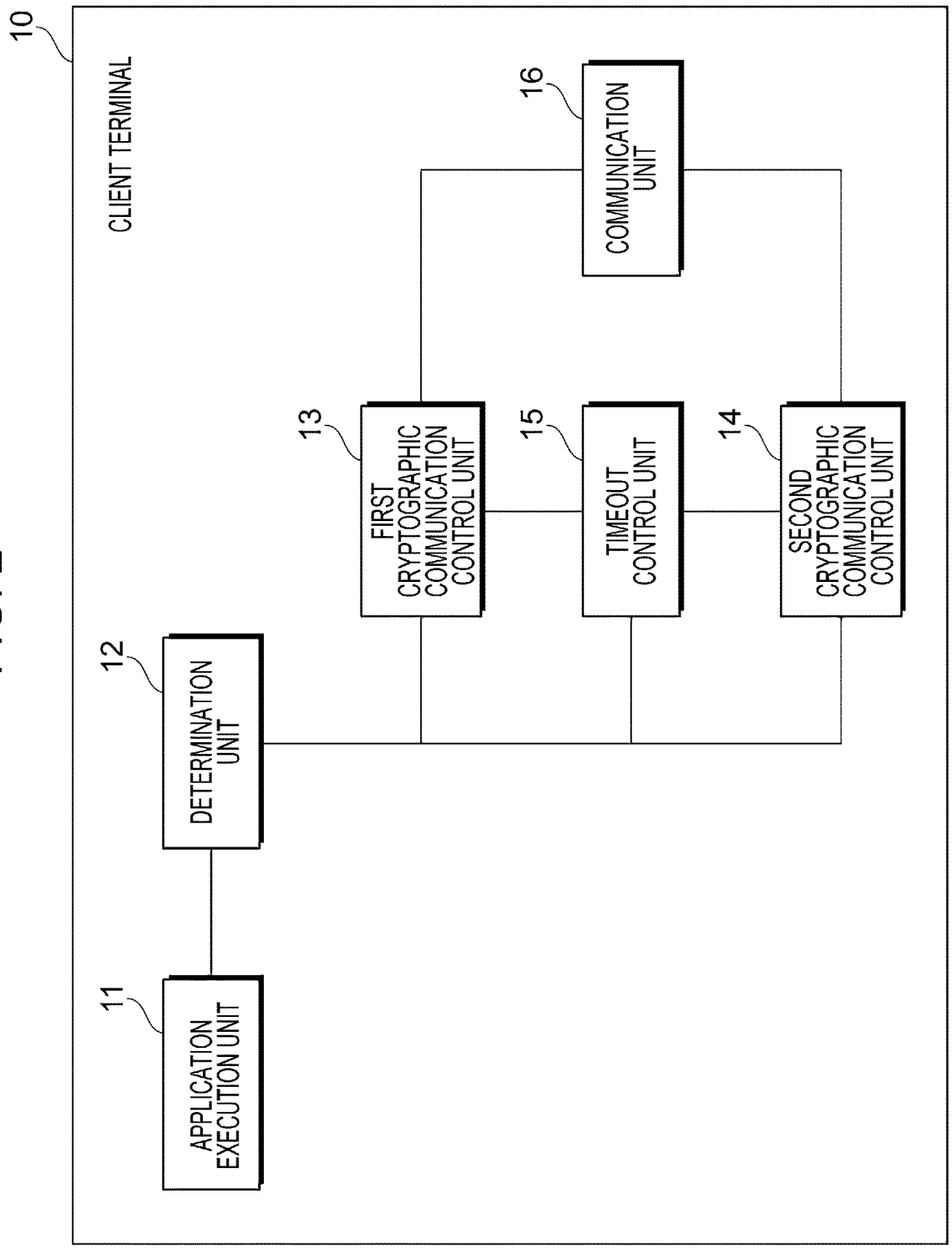
FIG. 2 is a diagram illustrating a functional configuration of a client terminal.

FIG. 2 is a diagram illustrating a functional configuration of the client terminal 10. The client terminal 10 includes an application execution unit 11, a determination unit 12, a first cryptographic communication control unit 13, a second cryptographic communication control unit 14, a timeout control unit 15, and a communication unit 16.

The application execution unit 11 is a processing unit that executes an application program (software) to perform various types of processing. Processing performed by the application execution unit 11 includes transmission and reception of e-mails. Based on a function provided by the application program, the application execution unit 11 starts e-mail software (mailer) and is connected to the e-mail server 20. Then, the application execution unit 11 specifies an address to transmit e-mails and obtains e-mails addressed to the client terminal 10.

The determination unit 12 monitors a connection request issued to the e-mail server 20 for transmission and reception of an e-mail by the application execution unit 11, and determines whether the connection request is performed by cryptographic communication or plain-text communication. In the case where the determination unit 12 determines that the connection request from the application execution unit 11 to the e-mail server 20 is issued by plain-text communication, the determination unit 12 interrupts an operation of the application execution unit 11 for communication (connection request).

In the case where the determination unit 12 determines that a connection request from the application execution unit 11 to the e-mail server 20 is plain-text communication, the first cryptographic communication control unit 13 issues a connection request by first cryptographic communication to the e-mail server 20 and then performs cryptographic communication. The first cryptographic communication represents a communication form in which an encrypted connection request is issued to the e-mail server 20 as a communication destination node, connection is established, and then cryptographic communication is performed. In the first cryptographic communication, a communication path is encrypted. Over secure socket layer (SSL) is an example of the first cryptographic communication.

A timeout is set for a connection operation performed by the first cryptographic communication control unit 13. As default setting, a specific period from issuance of a connection request is set for the timeout. Therefore, if no response is received from the e-mail server 20 within a set timeout limit period after a connection request is issued to the e-mail server 20 from the first cryptographic communication control unit 13, the connection request times out, and communication by the first cryptographic communication control unit 13 is canceled.

In the case where the determination unit 12 determines that a connection request from the application execution unit 11 to the e-mail server 20 is plain-text communication, the second cryptographic communication control unit 14 issues a connection request by second cryptographic communication to the e-mail server 20, concurrently with a connection request by the first cryptographic communication control unit 13, and then performs cryptographic communication. The second cryptographic communication represents a communication form in which a connection request by plain text is issued to the e-mail server 20 as a communication destination node, connection is established, and then cryptographic communication is performed. In the second cryptographic communication, encryption is performed within a communication protocol. STARTTLS is an example of the second cryptographic communication.

A timeout is set for a connection operation performed by the second cryptographic communication control unit 14, as with a connection operation by the first cryptographic communication control unit 13. Therefore, if no response is received from the e-mail server 20 within a set timeout limit period after a connection request is issued to the e-mail server 20 from the second cryptographic communication control unit 14, the connection request times out, and communication by the second cryptographic communication control unit 14 is canceled.

In the case where a connection request by the first cryptographic communication control unit 13 is issued, the timeout control unit 15 changes setting for the timeout for the first cryptographic communication control unit 13, in accordance with specific conditions. Specific details of how the timeout control unit 15 controls the timeout for the first cryptographic communication control unit 13 will be described later.

The communication unit 16 is an interface that allows the first cryptographic communication control unit 13 and the second cryptographic communication control unit 14 to be connected to the e-mail server 20 via a network and to perform communication. Furthermore, in the case where a connection request by cryptographic communication is issued from the application execution unit 11 to the e-mail server 20, the communication unit 16 performs communication of the connection request and e-mails by the application execution unit 11.

Functional Configuration of E-Mail Server

Figure 3:
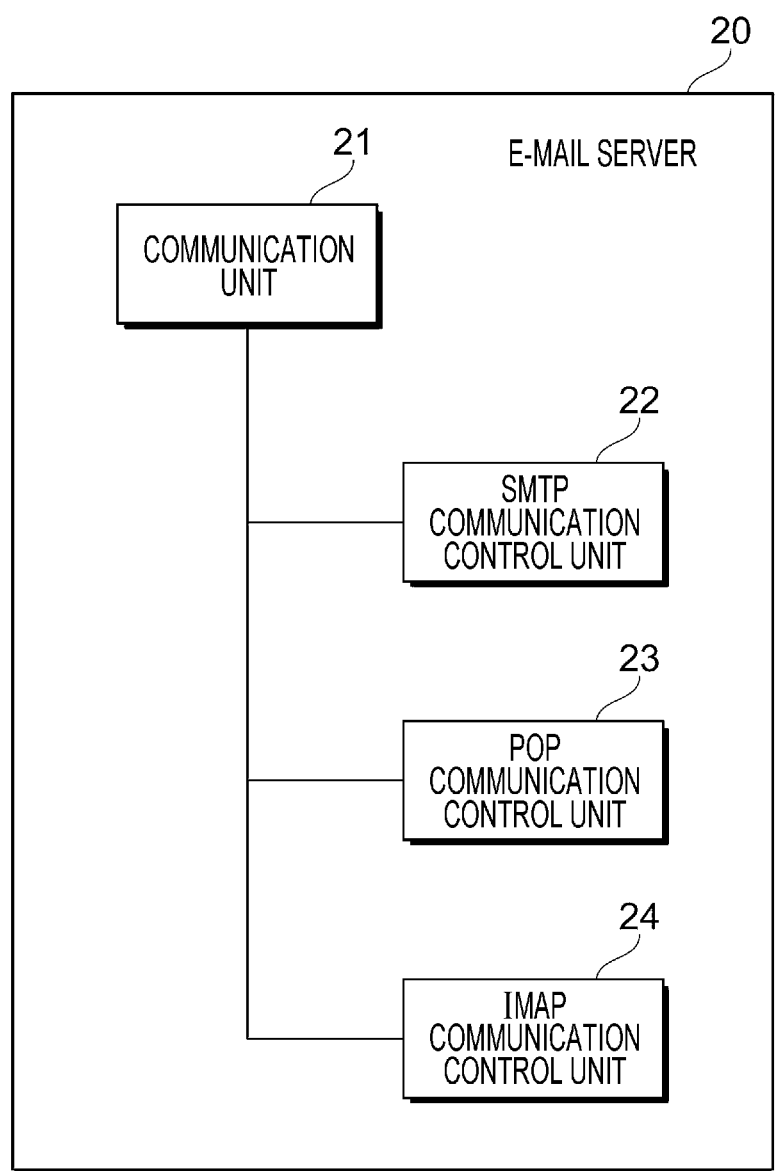
FIG. 3 is a diagram illustrating a functional configuration of an e-mail server.

FIG. 3 is a diagram illustrating a functional configuration of the e-mail server 20. The e-mail server 20 includes a communication unit 21, an SMTP communication control unit 22, a POP communication control unit 23, and an IMAP communication control unit 24. Although not particularly illustrated in FIG. 3, the e-mail server 20 includes a memory device that stores e-mails to be transmitted and received.

The communication unit 21 is an interface that allows e-mails to be transmitted and received to and from the client terminal 10 via the network and allows e-mails to be transmitted and received to and from another e-mail server 20 via the network. A simple mail transfer protocol (SMTP) is used as a communication protocol for transfer of e-mails to the e-mail server 20 from the client terminal 10 and transmission and reception of e-mails to and from another e-mail server 20. Furthermore, a post office protocol (POP) or an internet message access protocol (IMAP) is used as a communication protocol for transfer of e-mails from the e-mail server 20 to the client terminal 10.

The SMTP communication control unit 22 controls communication using the SMTP as a communication protocol. The SMTP communication control unit 22 receives a connection request from the client terminal 10 and establishes communication connection by the SMTP. After that, the SMTP communication control unit 22 receives an e-mail transmitted from the client terminal 10. Furthermore, the SMTP communication control unit 22 establishes communication connection by the SMTP with another e-mail server 20 to perform transmission and reception of e-mails.

The SMTP communication control unit 22 may support at least two types of cryptographic communications. One of the at least two types of cryptographic communications is first cryptographic communication, which is controlled by the first cryptographic communication control unit 13 of the client terminal 10. In the case where over SSL is used as the first cryptographic communication, the SMTP communication control unit 22 performs communication control by SMTP over SSL (SMTPs). The other one of the at least two types of cryptographic communications is the second cryptographic communication, which is controlled by the second cryptographic communication control unit 14 of the client terminal 10. In the case where STARTTLS is used as the second cryptographic communication, the SMTP communication control unit 22 performs communication control by SMTP STARTTLS. However, the SMTP communication control unit 22 of the e-mail server 20 does not necessarily support the cryptographic communications mentioned above. The SMTP communication control unit 22 may support only one of the cryptographic communications mentioned above or may support none of the cryptographic communications mentioned above.

The POP communication control unit 23 controls communication using POP Version 3 (POP3) as a communication protocol. The POP communication control unit 23 receives a connection request from the client terminal 10 and establishes communication connection by the POP3. After that, the POP communication control unit 23 transmits an e-mail in response to a reading request from the client terminal 10.

The POP communication control unit 23 may support at least two types of cryptographic communications. One of the at least two types of cryptographic communications is the first cryptographic communication, which is controlled by the first cryptographic communication control unit 13 of the client terminal 10. In the case where over SSL is used as the first cryptographic communication, the POP communication control unit 23 performs communication control by POP3 over SSL (POPs). The other one of the at least two types of cryptographic communications is the second cryptographic communication, which is controlled by the second cryptographic communication control unit 14 of the client terminal 10. In the case where STARTTLS is used as the second cryptographic communication, the POP communication control unit 23 performs communication control by POP3 STARTTLS. However, the POP communication control unit 23 of the e-mail server 20 does not necessarily support the cryptographic communications mentioned above. The POP communication control unit 23 may support only one of the cryptographic communications mentioned above or may support none of the cryptographic communications mentioned above.

The IMAP communication control unit 24 controls communication using the IMAP as a communication protocol. The IMAP communication control unit 24 receives a connection request from the client terminal 10, and establishes communication connection by the IMAP. After that, the IMAP communication control unit 24 transmits an e-mail in response to a reading request from the client terminal 10.

The IMAP communication control unit 24 may support at least two types of cryptographic communications. One of the at least two types of cryptographic communications is the first cryptographic communication, which is controlled by the first cryptographic communication control unit 13 of the client terminal 10. In the case where over SSL is used as the first cryptographic communication, the IMAP communication control unit 24 performs communication control by IMAP over SSL (IMAPs). In the case where STARTTLS is used as the second cryptographic communication, the IMAP communication control unit 24 performs communication control by IMAP STARTTLS. The other one of the at least two types of cryptographic communications is the second cryptographic communication, which is controlled by the second cryptographic communication control unit 14 of the client terminal 10. However, the IMAP communication control unit 24 of the e-mail server 20 does not necessarily support the cryptographic communications mentioned above. The IMAP communication control unit 24 may support only one of the cryptographic communications mentioned above or may support none of the cryptographic communications mentioned above.

Connection Control by First and Second
Cryptographic Communication Control Units Connection control by the first cryptographic communication control unit 13 and the second cryptographic communication control unit 14 of the client terminal 10 will be explained. The first cryptographic communication control unit 13 and the second cryptographic communication control unit 14 operate when a connection request by the application execution unit 11 is performed by plain text. At this time, the first cryptographic communication control unit 13 and the second cryptographic communication control unit 14 operate concurrently to issue connection requests to the e-mail server 20 by corresponding cryptographic communication systems.

Here, in the first cryptographic communication, an encrypted connection request is issued. In contrast, in the second cryptographic communication, a connection request is performed using plain text, and after connection is established, cryptographic communication is performed. Therefore, safety in information security for the first cryptographic communication is higher than that for the second cryptographic communication. Thus, in this exemplary embodiment, if both the first cryptographic communication and the second cryptographic communication are possible, the first cryptographic communication is prioritized. In contrast, even with the second cryptographic communication, after connection is established, cryptographic communication is performed. Therefore, a certain level of safety may be ensured even in the second cryptographic communication. Therefore, waiting for confirming whether or not connection by the first cryptographic communication is possible even when connection by the second cryptographic communication is possible (a response to a connection request is received from the email server 20) wastes time. Thus, in this exemplary embodiment, a timeout for a connection request by the first cryptographic communication control unit 13 is controlled. Therefore, in the case where connection by the second cryptographic communication is possible, wasting of time may be reduced, while the first cryptographic communication being prioritized.

Figure 4:
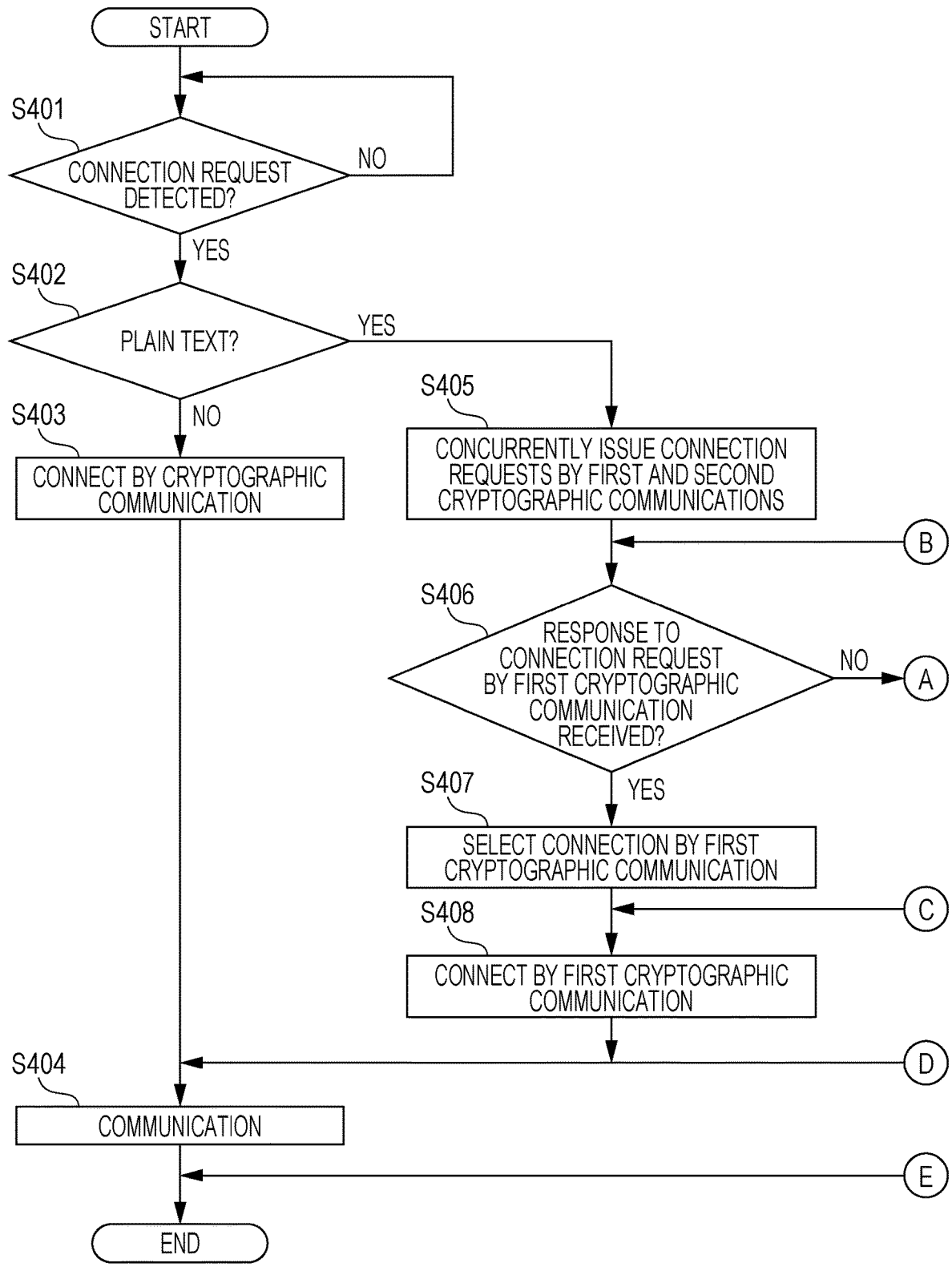
FIG. 4 is a flowchart illustrating an operation of a client terminal for performing communication.
Figure 5:
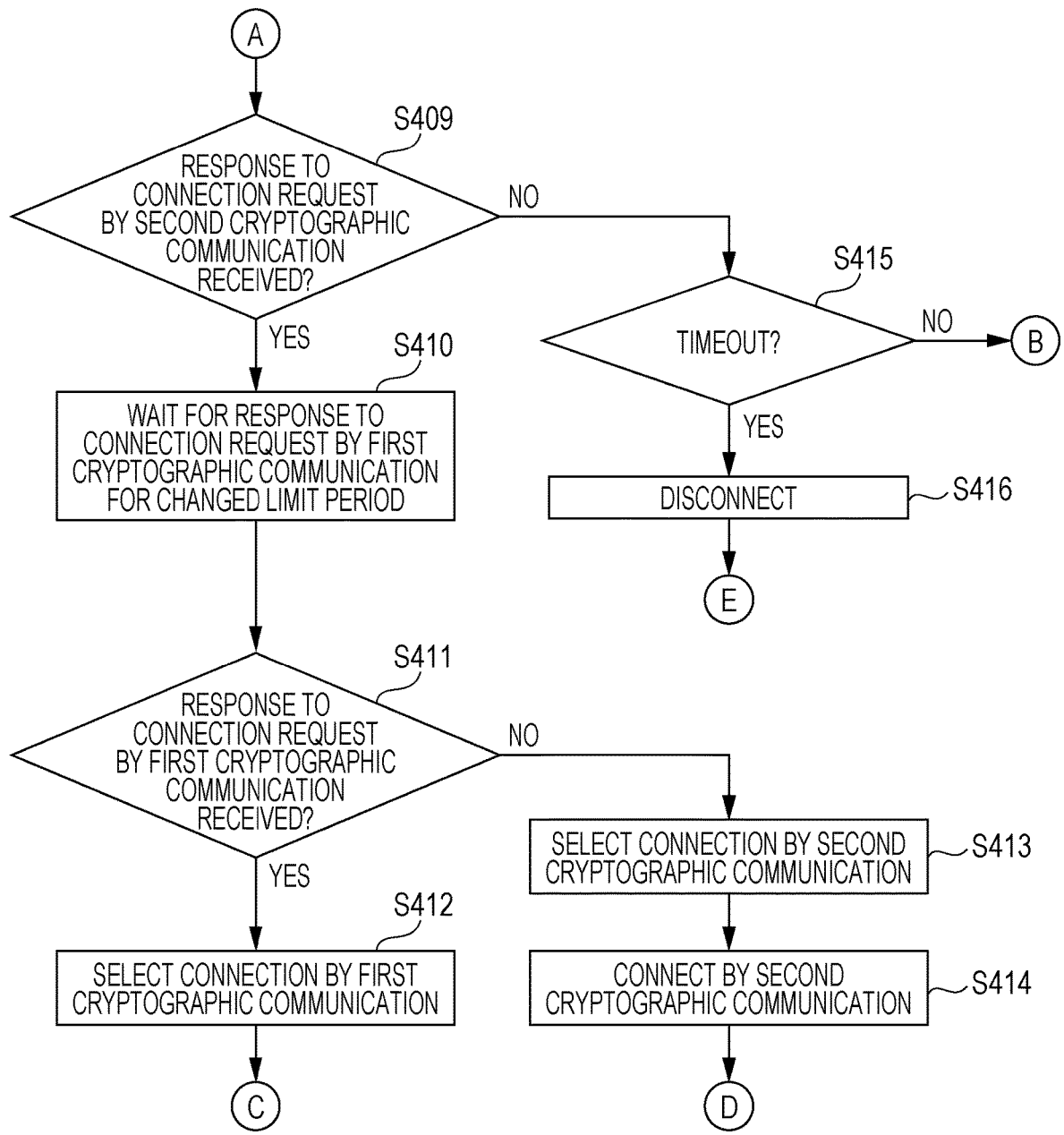
FIG. 5 is a flowchart illustrating an operation of the client terminal for performing communication.

FIGS. 4 and 5 are flowcharts illustrating an operation of the client terminal 10 for performing communication. In this example, an operation of the application execution unit 11 for transmitting an e-mail will be explained. When the determination unit 12 of the client terminal 10 detects that the application execution unit 11 has issued a connection request to the e-mail server 20, the determination unit 12 determines whether or not the connection request is plain text (S401, S402). In the case where an encrypted connection request is issued in communication using, for example, over SSL by the application execution unit 11 (NO in S402), the determination unit 12 directly transmits the connection request to the e-mail server 20 to establish connection by cryptographic communication (S403). When connection is established, the application execution unit 11 performs communication of an e-mail by cryptographic communication (S404).

In the case where the connection request by the application execution unit 11 is issued using plain text (YES in S402), the determination unit 12 interrupts the connection request by the application execution unit 11, and transmits notification to the first cryptographic communication control unit 13 and the second cryptographic communication control unit 14. Then, the first cryptographic communication control unit 13 and the second cryptographic communication control unit 14 concurrently issue connection requests to the e-mail server 20 (S405).

In the case where a response to the connection request by the first cryptographic communication control unit 13 is received from the e-mail server 20 earlier than or at the same time as reception of a response to the connection request by the second cryptographic communication control unit 14 (YES in S406), the client terminal 10 selects connection by the first cryptographic communication (S407), and the first cryptographic communication control unit 13 establishes connection with the e-mail server 20 by the first cryptographic communication (S408). Then, after connection is established, the application execution unit 11 performs communication of an e-mail via the first cryptographic communication control unit 13 (S404).

In contrast, in the case where a response to the connection request by the second cryptographic communication control unit 14 is received from the e-mail server 20 earlier than reception of the response to the connection request by the first cryptographic communication control unit 13 (NO in S406 and YES in S409), the timeout control unit 15 changes setting for the timeout for the connection request by the first cryptographic communication control unit 13. Specifically, the timeout limit period for the connection request by the first cryptographic communication control unit 13 is set to a specific period (for example, one second) from reception of the response to the connection request by the second cryptographic communication control unit 14 from the e-mail server 20. Then, the first cryptographic communication control unit 13 waits for a response to the connection request by the first cryptographic communication from the e-mail server 20 for the changed limit period (S410).

In the case where a response to the connection request by the first cryptographic communication control unit 13 is received from the e-mail server 20 before the changed limit period has passed (YES in S411), the client terminal 10 selects connection by the first cryptographic communication (S412), and the first cryptographic communication control unit 13 establishes connection with the e-mail server 20 by the first cryptographic communication (S408). When the connection is established, the application execution unit 11 performs communication of an e-mail via the first cryptographic communication control unit 13 (S404).

In contrast, in the case where the changed limit period has passed without a response to the connection request by the first cryptographic communication control unit 13 being received from the e-mail server 20 (NO in S411), the client terminal 10 selects connection by the second cryptographic communication (S413), and the second cryptographic communication control unit 14 establishes connection with the e-mail server 20 by the second cryptographic communication (S414). When the connection is established, the application execution unit 11 performs communication of an e-mail via the second cryptographic communication control unit 14 (S404).

Furthermore, in the case where both the connection request by the first cryptographic communication control unit 13 and the connection request by the second cryptographic communication control unit 14 time out without receiving any response from the e-mail server 20 (No in S406, NO in S409, and YES in S415), the first cryptographic communication control unit 13 and the second cryptographic communication control unit 14 disconnect communication. Furthermore, the determination unit 12 disconnects communication without resuming a connection request by the application execution unit 11 (S416).

The operation of the application execution unit 11 performed for transmitting an e-mail has been explained above as an example. A similar operation may be performed in the case where the application execution unit 11 receives an e-mail. That is, at the time when the client terminal 10 issues a connection request to the e-mail server 20, control by the determination unit 12, the first cryptographic communication control unit 13, the second cryptographic communication control unit 14, and the timeout control unit 15 is performed.

Control of Timeout

As explained in the operation example mentioned above, in this exemplary embodiment, in the case where a response to a connection request by the first cryptographic communication control unit 13 is received from the e-mail server 20 earlier than a response to a connection request by the second cryptographic communication control unit 14, connection is established by the first cryptographic communication, and cryptographic communication is then performed. Furthermore, in the case where a response to a connection request by the second cryptographic communication control unit 14 is received from the e-mail server 20 earlier than a response to a connection request by the first cryptographic communication control unit 13, the timeout limit period for the connection request by the first cryptographic communication control unit 13 is changed. Then, in the case where a response to the connection request by the first cryptographic communication control unit 13 is received from the e-mail server 20 within the changed limit period, connection is established by the first cryptographic communication, and cryptographic communication is then performed. In the case where a response to the connection request by the first cryptographic communication control unit 13 is not received from the e-mail server 20 within the changed limit period, connection is established by the second cryptographic communication, and cryptographic communication is then performed. With such control of the timeout, in the case where connection by the second cryptographic communication is possible, communication may be started without waiting for a default timeout limit period for a connection request by the first cryptographic communication control unit 13, while the first cryptographic communication being prioritized.

Regarding control of the timeout for a connection request by the first cryptographic communication control unit 13, a default limit period is set to a specific period from issuance of the connection request by the first cryptographic communication control unit 13, whereas the changed limit period is a specific period from reception of a response to a connection request by the second cryptographic communication control unit 14. For example, the default limit period is set to 30 seconds, and the changed limit period is set to 2 seconds. Furthermore, the timeout limit period for the connection request by the second cryptographic communication control unit 14 is set to 30 seconds, which is the same as the default timeout limit period for the connection request by the first cryptographic communication control unit 13. In this case, if neither a response to the connection request by the first cryptographic communication control unit 13 nor a response to the connection request by the second cryptographic communication control unit 14 is received, both the connection requests time out 30 seconds after the issuance of the connection request by the first cryptographic communication control unit 13 and the issuance of the connection request by the second cryptographic communication control unit 14.

In contrast, when a response to the connection request by the second cryptographic communication control unit 14 is received, the timeout limit period for the connection request by the first cryptographic communication control unit 13 is changed to 2 seconds from reception of the response. For example, a case where a response to a connection request by the second cryptographic communication control unit 14 is received 15 seconds after the issuance of a connection request by the first cryptographic communication control unit 13 and the issuance of the connection request by the second cryptographic communication control unit 14 will be considered. In this case, the changed timeout limit period for the connection request by the first cryptographic communication control unit 13 is 2 seconds from reception of the response to the connection request by the second cryptographic communication control unit 14. Therefore, the timeout limit period is shortened to 17 seconds from the issuance of the connection request by the first cryptographic communication control unit 13.

As described above, in this exemplary embodiment, in the case where a response to a connection request by the second cryptographic communication control unit 14 is received, the timeout limit period for a connection request by the first cryptographic communication control unit 13 is shortened. Therefore, the time required between issuance of a connection request and starting communication may be shortened. In contrast, in the case where a response to a connection request by the second cryptographic communication control unit 14 is received, instead of immediately establishing connection by the second cryptographic communication, a response to a connection request by the first cryptographic communication control unit 13 is waited for a specific period. In the case where a response to the connection request by the first cryptographic communication control unit 13 is received within the specific period, connection by the first cryptographic communication is established, and communication is then performed. Accordingly, the first cryptographic communication, which has a higher safety in information security, is prioritized.

Regarding the control for the timeout mentioned above, in the case where the response to the connection request by the second cryptographic communication control unit 14 is received immediately before the limit period expires, the changed timeout limit period for the connection request by the first cryptographic communication control unit 13 may exceed the default timeout limit period. For example, it is assumed that a response to the connection request by the second cryptographic communication control unit 14 is received 29 seconds after the issuance of the connection requests by the first cryptographic communication control unit 13 and the second cryptographic communication control unit 14. In this case, a changed timeout limit period for the connection request by the first cryptographic communication control unit 13 is 2 seconds after the reception of the response to the connection request by the second cryptographic communication control unit 14, and is thus 31 seconds after the issuance of the connection request by the first cryptographic communication control unit 13. Therefore, the changed timeout limit period exceeds a default timeout limit period, which is 30 seconds. However, in this case, if a response to the connection request by the first cryptographic communication control unit 13 is received within the changed timeout limit period, the first cryptographic communication, which has a higher safety, may be performed. Therefore, even though the timeout limit period is substantially extended, the above-mentioned control for the timeout is performed.

Availability of Plain-Text Communication

In the operation example explained above with reference to FIGS. 4 and 5, in the case where both the connection request by the first cryptographic communication control unit 13 and the connection request by the second cryptographic communication control unit 14 time out, communication is disconnected. Therefore, plain-text communication, which has a low safety in information security, is not performed. Accordingly, in the case where the e-mail server 20 supports neither the first cryptographic communication (for example, over SSL) nor the second cryptographic communication (for example, STARTTLS), e-mails are not able to be transmitted from the application execution unit 11. However, depending on the user or the content of communication, communication needs to be performed even with a reduced safety. In such a case, even if both the connection request by the first cryptographic communication control unit 13 and the connection request by the second cryptographic communication control unit 14 time out, a user may be able to select plain-text connection and communication, instead of disconnecting communication.

Modifications

Figure 6:
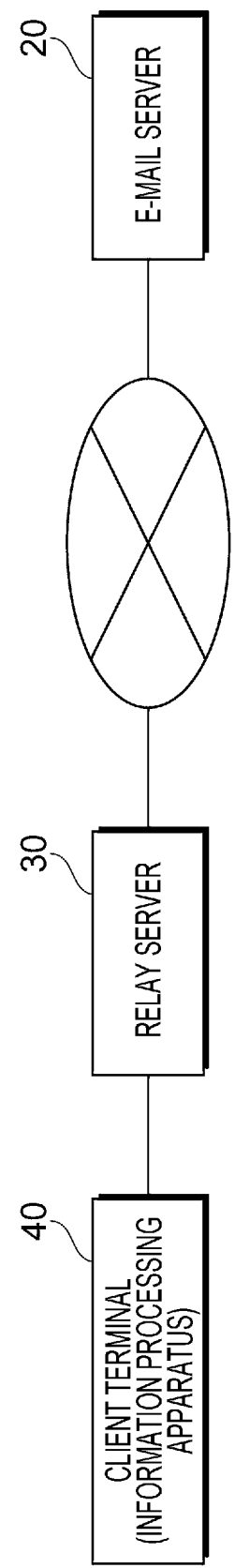
FIG. 6 is a diagram illustrating a modification of the exemplary embodiment.

FIG. 6 is a diagram illustrating a modification of this exemplary embodiment. An information processing system illustrated in FIG. 6 includes the e-mail server 20, a relay server 30, and a client terminal 40. The e-mail server 20 is similar to the e-mail server 20 explained above with reference to FIGS. 1 and 3. The relay server 30 relays communication of e-mails between the client terminal 40 and the e-mail server 20. The relay server 30 and the client terminal 40 are connected via a high-safety network such as a local area network (LAN) that is not able to be connected without permission. The client terminal 40 transmits and receives e-mails to and from another information processing apparatus via the e-mail server 20, as with the client terminal 10 explained above with reference to FIGS. 1 and 2.

In the modification illustrated in FIG. 6, the relay server 30 monitors a connection request to the e-mail server 20 from the client terminal 40. In a case where the connection request is issued using plain text, the relay server 30 interrupts the connection request, and issues connection requests by the first cryptographic communication and the second cryptographic communication to the e-mail server 20.

Figure 7:
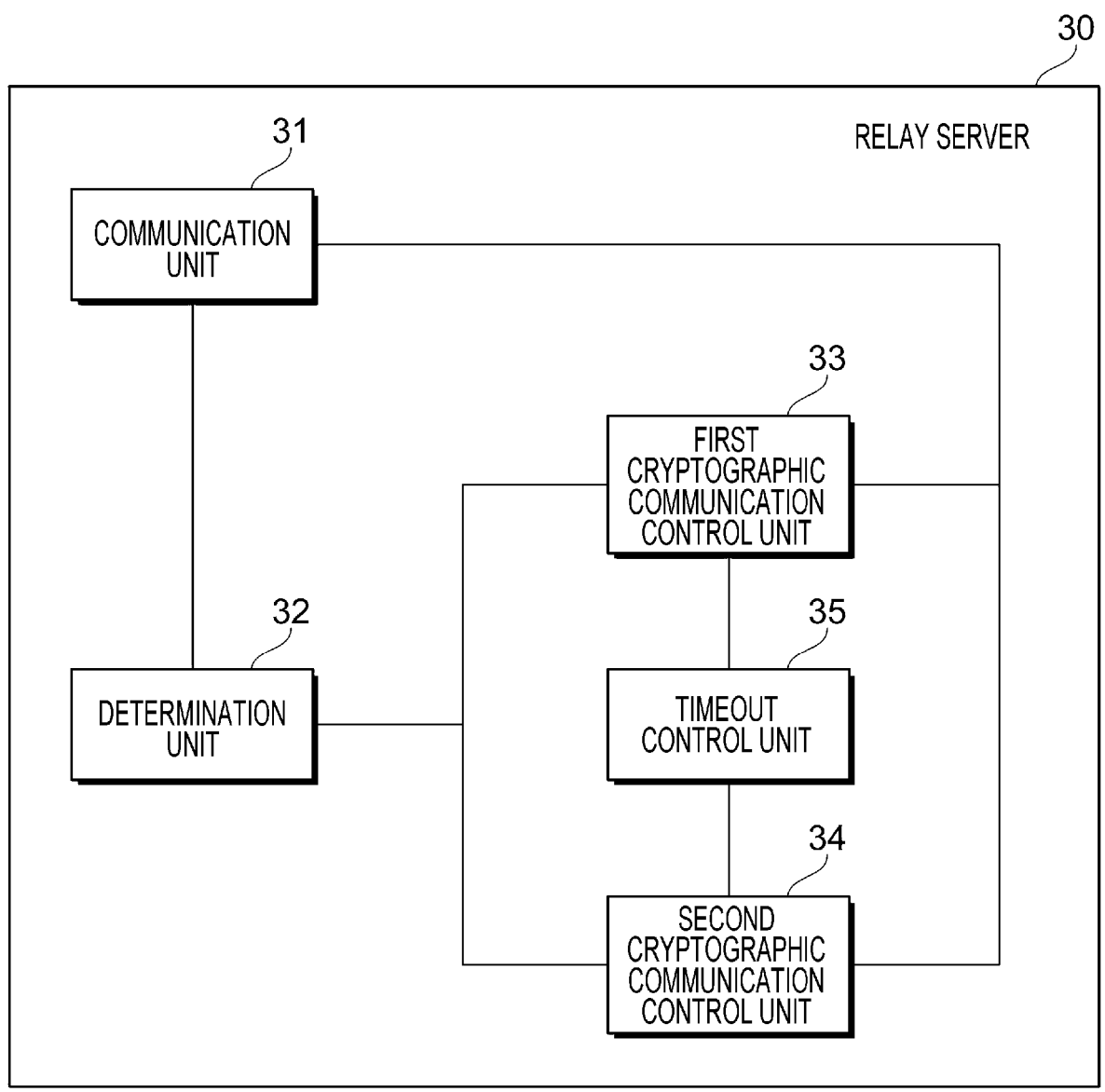
FIG. 7 is a diagram illustrating a functional configuration of a relay server.

FIG. 7 is a diagram illustrating a functional configuration of the relay server 30. The relay server 30 includes a communication unit 31, a determination unit 32, a first cryptographic communication control unit 33, a second cryptographic communication control unit 34, and a timeout control unit 35. The communication unit 31 relays communication between the client terminal 40 and the e-mail server 20.

The determination unit 32, the first cryptographic communication control unit 33, the second cryptographic communication control unit 34, and the timeout control unit 35 are similar to the determination unit 12, the first cryptographic communication control unit 13, the second cryptographic communication control unit 14, and the timeout control unit 15 of the client terminal 10, which have been explained above with reference to FIG. 2. That is, in the modification illustrated in FIG. 6, functions of the first cryptographic communication control and the second cryptographic communication control included in the client terminal 10 illustrated in FIG. 2 are implemented by the relay server 30, which is an external apparatus. Therefore, operations of the determination unit 32, the first cryptographic communication control unit 33, the second cryptographic communication control unit 34, and the timeout control unit 35 are similar to operations explained above with reference to FIGS. 4 and 5.

Because the relay server 30 has the functions of the first cryptographic communication control and the second cryptographic communication control, the client terminal 40 does not necessarily include the functions of the first cryptographic communication control and the second cryptographic communication control. Furthermore, the relay server 30 may perform communication control by cryptographic communication for a plurality of client terminals 40 for which the relay server 30 relays communication.

Hardware Configuration Example

Figure 8:
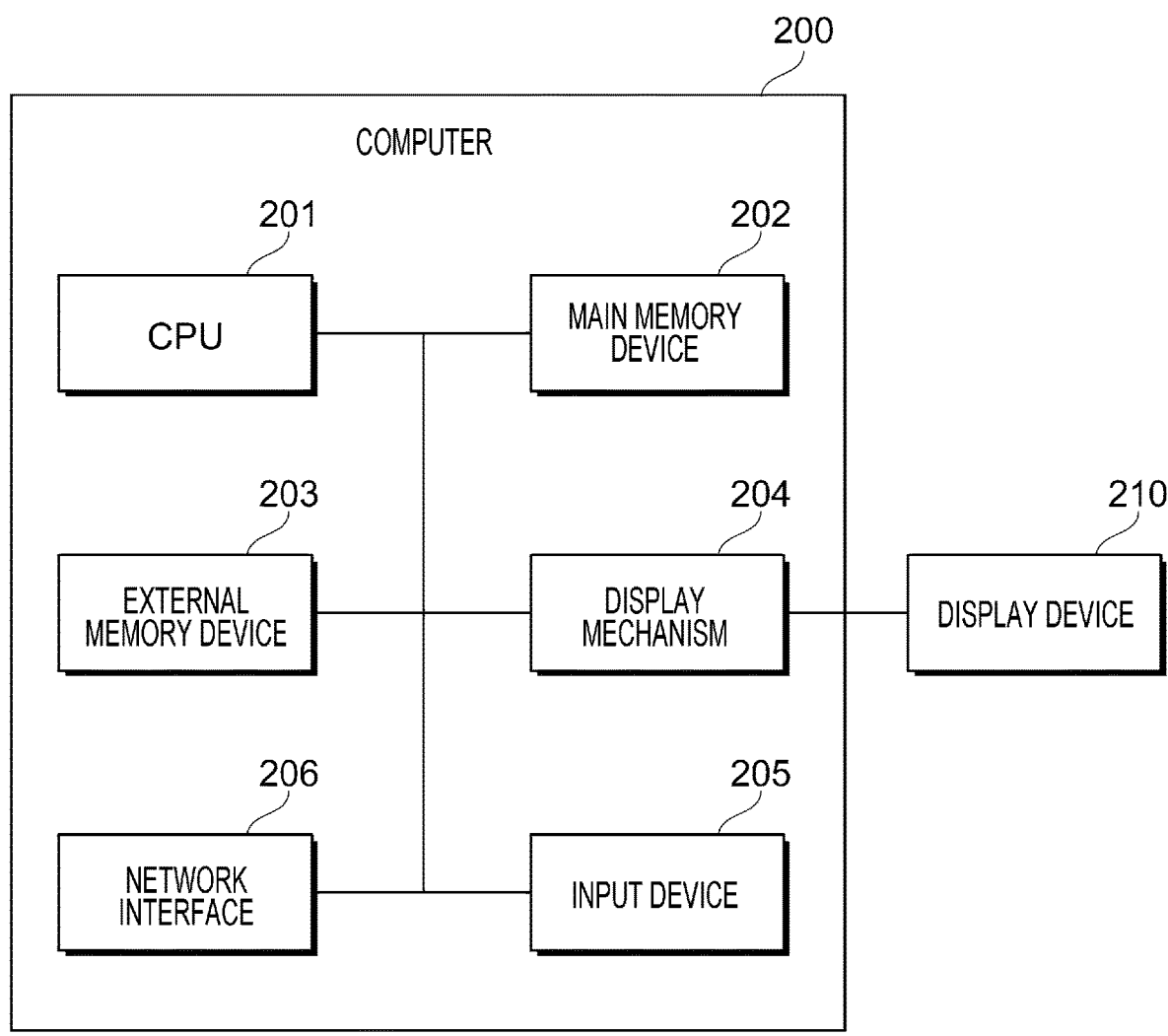
FIG. 8 is a diagram illustrating an example of a hardware configuration of a computer that implements a client terminal.

FIG. 8 is a diagram illustrating an example of a hardware configuration of a computer that implements the client terminal 10. A computer 200 illustrated in FIG. 8 includes a central processing unit (CPU) 201 as a computing unit and a main memory device 202 and an external memory device 203 as memory units. The CPU 201 reads a program stored in the external memory device 203 into the main memory device 202 and executes the program. For example, a random access memory (RAM) is used as the main memory device 202. For example, a magnetic disk device, a solid state drive (SSD), or the like is used as the external memory device 203. Furthermore, the computer 200 includes a display mechanism 204 for performing display and output on a display device (display) 210 and an input device 205 that allows a user of the computer 200 to perform an input operation. For example, a keyboard, a mouse, and the like are used as the input device 205. Furthermore, the computer 200 also includes a network interface 206 for allowing connection with a network. The configuration of the computer 200 illustrated in FIG. 8 is merely an example, and the configuration of the computer used in this exemplary embodiment is not limited to the example illustrated in FIG. 8. For example, the computer may include a nonvolatile memory such as a flash memory and a read only memory (ROM) as a memory device.

In the case where the client terminal 10 illustrated in FIG. 2 is implemented by the computer illustrated in FIG. 8, functions of the application execution unit 11, the determination unit 12, the first cryptographic communication control unit 13, the second cryptographic communication control unit 14, and the timeout control unit 15 are implemented when, for example, the CPU 201 executes a program. The communication unit 16 is implemented by, for example, the network interface 206.

Exemplary embodiments of the present disclosure have been explained above. However, the technical scope of the present disclosure is not limited to the exemplary embodiments described above. For example, in the foregoing exemplary embodiments, the case where the application execution unit 11 performs communication of e-mails has been explained. However, the present disclosure may also be applied to communications other than communication using e-mails. That is, at the time of issuing a connection request to an apparatus as a communication destination node before starting communication, determination by the determination unit 12, communication control by the first cryptographic communication control unit 13 and the second cryptographic communication control unit 14, control of the timeout for the first cryptographic communication control unit 13 by a timeout control unit, and the like are performed. Various changes and replacement in configuration made without departing from the technical scope of the present disclosure are also included in the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a hardware processor programmed to function as:
   a first cryptographic communication control unit that issues an encrypted connection request to a communication destination node and performs cryptographic communication;
   a second cryptographic communication control unit that issues, concurrently with the connection request by the first cryptographic communication control unit, a connection request by plain text to the communication destination node, establishes connection, and then performs cryptographic communication; and
   a timeout control unit that changes a period for a timeout set in advance for the connection request by the first cryptographic communication control unit in a case where a response to the connection request by the second cryptographic communication control unit is received from the communication destination node before a response to the connection request by the first cryptographic communication control unit is received from the communication destination node,
   wherein the timeout control unit changes the period for the timeout set for the connection request by the first cryptographic communication control unit to a period based on a point in time when the response to the connection request by the second cryptographic communication control unit is received from the communication destination node, and
   wherein in a case where after the response to the connection request by the second cryptographic communication control unit is received, the response to the connection request by the first cryptographic communication control unit is received within the changed period for the timeout, the first cryptographic communication control unit establishes connection based on the connection request by the first cryptographic communication control unit instead of based on the connection request by the second cryptographic communication control unit.

2. The information processing apparatus according to claim 1,
   wherein in a case where the response to the connection request by the second cryptographic communication control unit is received from the communication destination node before the response to the connection request by the first cryptographic communication control unit is received from the communication destination node, the timeout control unit changes the period for the timeout set for the connection request by the first cryptographic communication control unit to a period shorter than a default period.

3. The information processing apparatus according to claim 1,
wherein the hardware processor is further configured to function as a determination unit that determines whether communication executed under control of application software is cryptographic communication or plain-text communication,
wherein in a case where the determination unit determines that the communication is plain-text communication, the first cryptographic communication control unit and the second cryptographic communication control unit concurrently issue the connection requests to the communication destination node.

4. The information processing apparatus according to claim 3,
wherein in a case where both the connection request by the first cryptographic communication control unit and the connection request by the second cryptographic communication control unit time out, the first cryptographic communication control unit and the second cryptographic communication control unit interrupt the communication executed under control of the application software.

5. A non-transitory computer readable medium storing a program causing a computer to execute a process for information processing, the process comprising:
determining whether communication executed under control of application software is cryptographic communication or plain-text communication;
concurrently issuing, in a case where the communication is plain-text communication, a connection request by first cryptographic communication control in which an encrypted connection request is issued to a communication destination node and cryptographic communication is performed and a connection request by second cryptographic communication control in which a connection request by plain text is issued to the communication destination node, connection is established, and cryptographic communication is then performed;
changing a period for a timeout set in advance for the connection request by the first cryptographic communication control in a case where a response to the connection request by the second cryptographic communication control is received from the communication destination node before a response to the connection request by the first cryptographic communication control is received from the communication destination node,
wherein the changing changes the period for the timeout set for the connection request by the first cryptographic communication control to a period based on a point in time when the response to the connection request by the second cryptographic communication control is received from the communication destination node, and
wherein in a case where after the response to the connection request by the second cryptographic communication control is received, the response to the connection request by the first cryptographic communication control is received within the changed period for the timeout, the first cryptographic communication control establishes connection based on the connection request by the first cryptographic communication control instead of based on the connection request by the second cryptographic communication control; and
performing the cryptographic communication by the first cryptographic communication control in a case where the response to the connection request by the first cryptographic communication control is received from the communication destination node and performing the cryptographic communication by the first cryptographic communication control in a case where the response to the connection request by the second cryptographic communication control is received from the communication destination node and the period for the timeout for the connection request by the first cryptographic communication control has passed.

6. An information processing apparatus comprising:
first cryptographic communication control means for issuing an encrypted connection request to a communication destination node and performing cryptographic communication;
second cryptographic communication control means for issuing, concurrently with the connection request by the first cryptographic communication control means, a connection request by plain text to the communication destination node, establishing connection, and then performing cryptographic communication; and
timeout control means for changing a period for a timeout set in advance for the connection request by the first cryptographic communication control means in a case where a response to the connection request by the second cryptographic communication control means is received from the communication destination node before a response to the connection request by the first cryptographic communication control means is received from the communication destination node,
wherein the timeout control means changes the period for the timeout set for the connection request by the first cryptographic communication control means to a period based on a point in time when the response to the connection request by the second cryptographic communication control means is received from the communication destination node, and
wherein in a case where after the response to the connection request by the second cryptographic communication control means is received, the response to the connection request by the first cryptographic communication control means is received within the changed period for the timeout, the first cryptographic communication control means establishes connection based on the connection request by the first cryptographic communication control means instead of based on the connection request by the second cryptographic communication control means.

* * * * *